United States Patent [19]

Suganuma et al.

[11] Patent Number: 5,483,253
[45] Date of Patent: Jan. 9, 1996

[54] PORTABLE INFORMATION PROCESSING APPARATUS AND LIQUID CRYSTAL DISPLAY DEVICE

[75] Inventors: Yuzi Suganuma; Shigeru Matsuoka; Keiji Kamio; Yoshihiro Kashiwa, all of Hitachi; Seizi Nogami, Mito; Kouichi Saito, Kitaibaraki; Isao Yamazaki, Hitachi; Hidechika Kigoshi, Kitaibaraki; Naofumi Aoyama; Toru Watanabe, both of Mobara; Yoshihiro Nozaki, Chiba, all of Japan

[73] Assignee: Hitachi, Ltd., Tokyo, Japan

[21] Appl. No.: 914,548

[22] Filed: Jul. 16, 1992

[30] Foreign Application Priority Data

Jul. 17, 1991 [JP] Japan .................................. 3-176528
Aug. 29, 1991 [JP] Japan .................................. 3-218252

[51] Int. Cl.⁶ .................................................. G06F 15/20
[52] U.S. Cl. ........................... 345/87; 345/905; 361/680; 361/681; 361/685
[58] Field of Search ................................. 340/700, 711, 340/718, 719, 784; 361/380, 393, 394, 679, 680, 681, 682, 683, 684, 685; 341/22; 364/708; 359/48, 50; 345/87, 901, 903, 905

[56] References Cited

U.S. PATENT DOCUMENTS

| | | | |
|---|---|---|---|
| 4,490,604 | 12/1984 | Read et al. ................................. | 235/146 |
| 4,667,299 | 5/1987 | Dunn ........................................ | 364/708 |
| 4,749,875 | 6/1988 | Hara ......................................... | 364/708 |
| 4,842,378 | 6/1989 | Flasck et al. ............................. | 364/708 |
| 4,958,889 | 9/1990 | Boyle et al. .............................. | 361/380 |
| 5,036,313 | 7/1991 | Lin et al. .................................. | 345/905 |
| 5,049,866 | 9/1991 | Miyajima .................................. | 345/87 |
| 5,252,955 | 10/1993 | Davis et al. ............................... | 345/87 |
| 5,325,262 | 6/1994 | Ma ............................................. | 345/905 |

FOREIGN PATENT DOCUMENTS 61-160526  4/1986  Japan .

Primary Examiner—Tommy P. Chin
Assistant Examiner—Kara A. Farnandez
Attorney, Agent, or Firm—Antonelli, Terry, Stout & Kraus

[57] ABSTRACT

A portable wordprocessor has a main body and a display support assembly hinged to the main body. The main body has an information entry keyboard, a function keyboard, a control circuit board and a floppy disk drive. The information entry keyboard and the function keyboard have key tops the heights of which do not exceed the height of the portion of the main body which accommodates the floppy disk drive. The information entry keyboard is disposed along the front edge of the main body, while the function keyboard is disposed between the information entry keyboard and the rear edge of the main body. The floppy disk drive is disposed in lateral alignment with the function keyboard. The display support assembly supports a liquid crystal display device which includes a liquid crystal display portion and a liquid crystal control circuit board which is disposed around the liquid crystal display portion and has a thickness which does not exceed the thickness of the liquid crystal display portion.

30 Claims, 9 Drawing Sheets

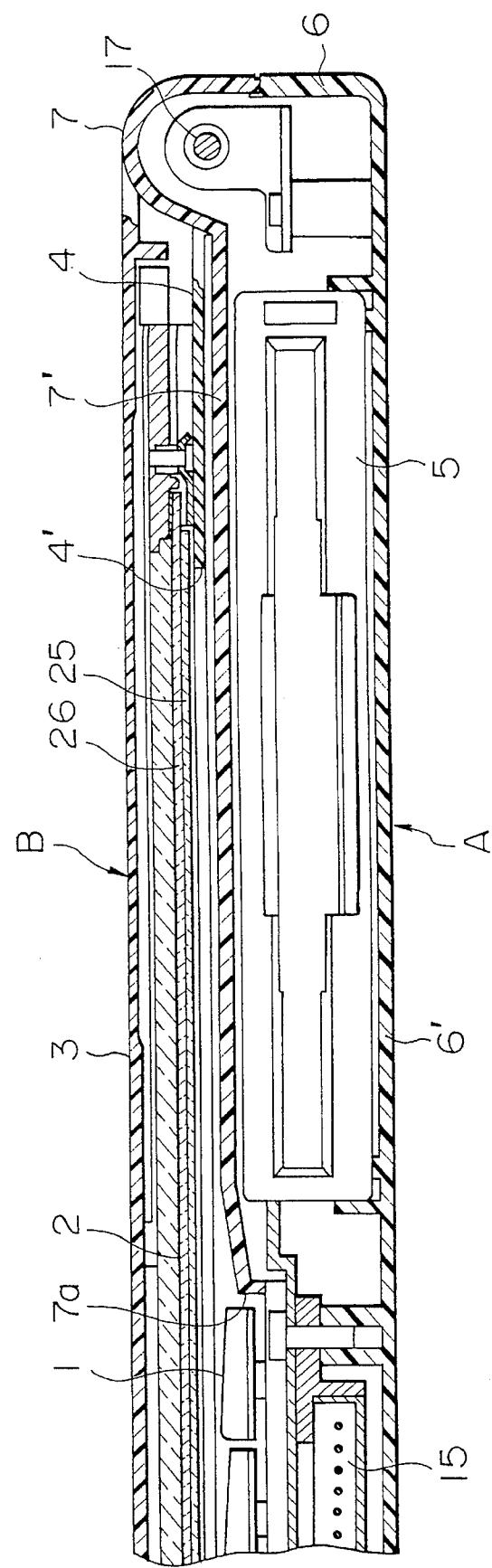

PORTABLE INFORMATION PROCESSING APPARATUS AND LIQUID CRYSTAL DISPLAY DEVICE

BACKGROUND OF THE INVENTION

1. Field of the Invention

The present invention relates to a portable information processing apparatus such as a book-type wordprocessor or personal computer and, more particularly, to a portable information processing apparatus having reduced thickness and weight for greater portability.

2. Description of the Prior Art

Portable information processing apparatus such as portable wordprocessors and portable personal computers are finding remarkably spreading use in recent years. An example of such an information processing apparatus is disclosed in Japanese Unexamined Utility Model Publication No. 61-160526. This apparatus has a main body which includes a keyboard as an input device, a control circuit board, an external storage driving device such as a floppy disk drive, an internal power supply, and so forth, and a cover, i.e., a display support assembly, which is hinged to the main part and supports a liquid crystal display device.

In this known apparatus, the main body is composed of a lower part and an upper part. The disk drive device is disposed in the upper part and the key tops of the keyboard project upwardly from the upper part. In order to protect the liquid crystal display surface, the apparatus is designed such that, when the apparatus is not used, the cover is swung to a close position where display surface opposes the main body leaving a predetermined gap therebetween. Consequently, this design undesirably increases the overall height or thickness of the apparatus. In addition, the display support assembly which forms the cover essentially has a large thickness because it contains a liquid crystal display unit including a liquid crystal display glass sheet, light guide plate, liquid crystal control circuit board and other components, as well as a metal frame encasing these components. Consequently, the whole apparatus including the tall main body and the thick display support assembly superposed thereto inevitably has a large thickness and, therefore, is not easy to carry and transport. The large overall height of the apparatus also impairs operability of the apparatus when the latter is used on a desk.

SUMMARY OF THE INVENTION

Accordingly, an object of the present invention is to provide a portable information processing apparatus having a main body of a reduced thickness.

Another object of the present invention is to provide a portable information processing apparatus in which the heights of the key tops of the keyboard means provided on the main body do not exceed the height of the portion of the main body which accommodates an external storage driving device.

Still another object of the present invention is to provide a portable information processing apparatus having a liquid crystal display device of a reduced thickness.

A further object of the present invention is to provide a portable information processing apparatus including a main body of a reduced thickness and a display support assembly of a reduced thickness.

A still further object of the present invention is to provide a liquid crystal display device of a reduced thickness.

According to one aspect of the present invention, there is provided a portable information processing apparatus comprising a main body supporting keyboard means, a control circuit board for controlling the whole apparatus and drive means for driving an external storage means; and display support means pivotally connected to the main body and supporting liquid crystal display means. The main body includes a lower part having a bottom wall and an upper part having a top wall. The drive means is interposed between the bottom wall and the top wall. The portion of the top wall covering the drive means has a first height. The control circuit board is disposed between the bottom wall and the keyboard means. The stack of the bottom wall, the control circuit board and the key board has a height substantially the same as the first height.

According to another aspect of the invention, there is provided a portable information processing apparatus comprising a main body having upper and lower parts; an information entry keyboard secured to the lower part of the main body and having a plurality of keys for inputting mainly character information; a function keyboard secured to the upper part of the main body and having a plurality of function keys; a control circuit board for controlling the whole apparatus, the control circuit board being carried by the lower part of the main body at a position under the information entry keyboard and the function keyboard; power supply circuit means provided on the control circuit board; drive means for driving external storage means for storing information input through operation of the information entry keyboard, the drive means being secured to the upper part of the main body; liquid crystal display means for displaying data input through operation of the information entry keyboard or information stored in the storage means; and display support means supporting the liquid crystal display means and pivotally connected to the main part. The information entry keyboard is disposed along the front edge of the main body. The function keyboard is disposed between the information entry keyboard and the rear edge of the main body. The drive means is disposed in lateral alignment with the function keyboard.

According to still another aspect of the invention, there is provided a portable information processing apparatus comprising a main body supporting a control circuit board and drive means for driving an external storage means; keyboard means secured to the main body; display support means pivotally connected to the main body; and a liquid crystal display means supported by said display support means and including a liquid crystal display portion and a liquid crystal control circuit board means. The liquid crystal control circuit board means is disposed adjacent to the peripheral edge of the liquid crystal display portion and has a thickness which does not exceed the thickness of the liquid crystal display portion.

According to a further aspect of the invention, there is provided a liquid crystal display device comprising a liquid crystal display portion; a light guide plate disposed behind and adjacent to the rear side of the liquid crystal display portion; a cold cathode ray tube for applying light to the light guide plate; an inverter circuit board for controlling the cold cathode ray tube; and liquid crystal control circuit board means. The cold cathode ray tube, the inverter circuit board and the liquid crystal control circuit board means are disposed adjacent to the periphery of the liquid crystal display portion are substantially in the same plane as the liquid crystal display portion. Each of the cold cathode ray tube, the inverter circuit board and the liquid crystal control circuit board means has a thickness which does not exceed the thickness of the stack of the liquid crystal display portion and the light guide plate.

According to a still further aspect of the invention, there is provided a portable information processing apparatus comprising a main body having upper and lower parts; an information entry keyboard mounted on the lower part of the main body and having a plurality of keys for inputting mainly character information; a function keyboard secured to the upper part of the main body and having a plurality of function keys; a control circuit board for controlling the whole apparatus, the control circuit board being carried by the lower part of the main body at a position under the information entry keyboard and the function keyboard; power supply circuit means provided on the control circuit board; drive means for driving external storage means for storing information input through operation of the information entry keyboard, the drive means being mounted on to the lower part of the main part; liquid crystal display means for displaying either the data input through operation of the information entry keyboard or information stored in the external storage means; and display support means supporting the liquid crystal display means and pivotally connected to the main body. The information entry keyboard is disposed along the front edge of the main body. The function keyboard is disposed between the information entry keyboard and the rear edge of the main body. The drive means is disposed in lateral alignment with the function keyboard. The liquid crystal display means includes a liquid crystal display portion and a liquid crystal control circuit board means. The liquid crystal control circuit board means is disposed adjacent to the periphery of the liquid crystal display portion and has a thickness which does not exceed the thickness of the liquid crystal display portion.

These and other objects, features and advantages of the present invention will be made more apparent by the following description with reference to the accompanying drawings.

BRIEF DESCRIPTION OF THE DRAWINGS

FIG. 4A is a fragmentary enlarged sectional view of the wordprocessor taken substantially along the line IVA—IVA in FIG. 3;

DESCRIPTION OF THE PREFERRED EMBODIMENT

Figure 1:
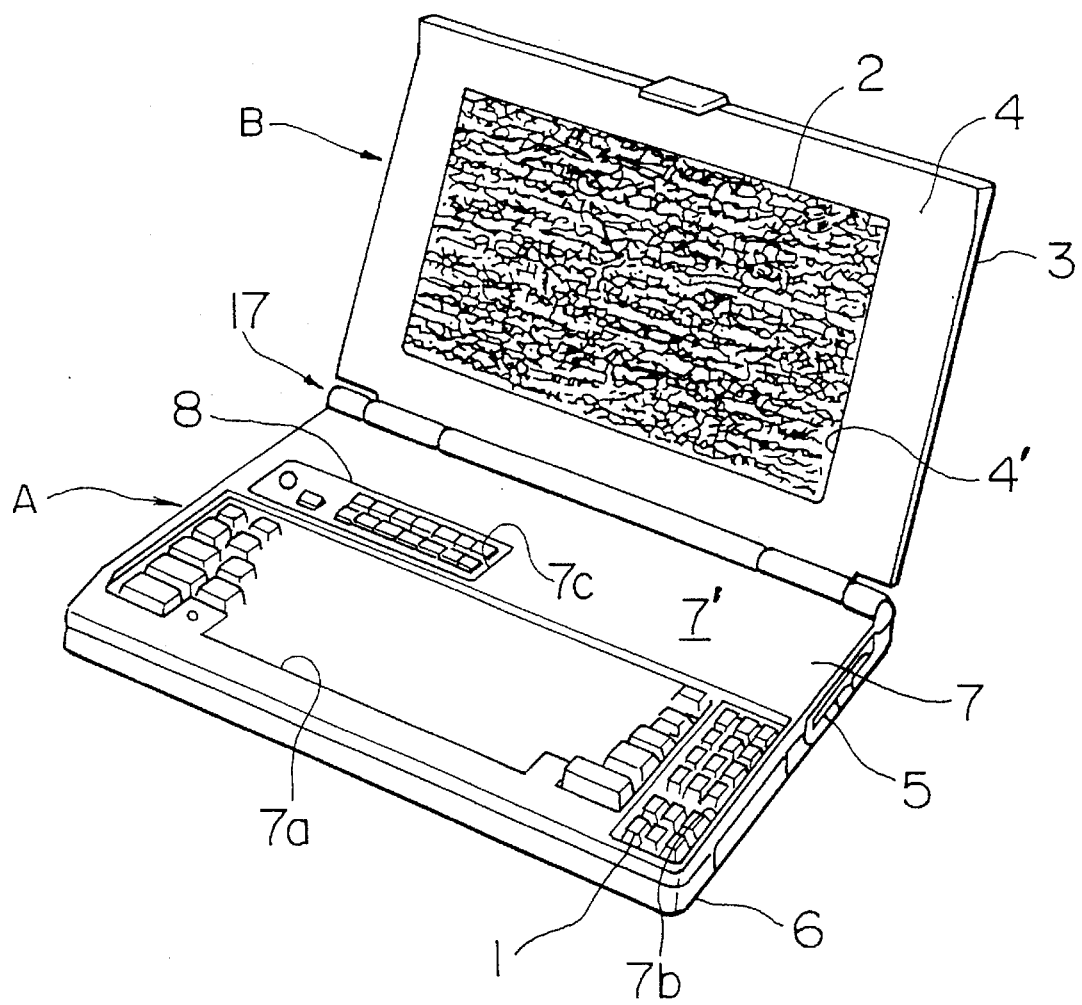
FIG. 1 is a perspective view of a lap-top type wordprocessor in a state ready for use.
Figure 6:
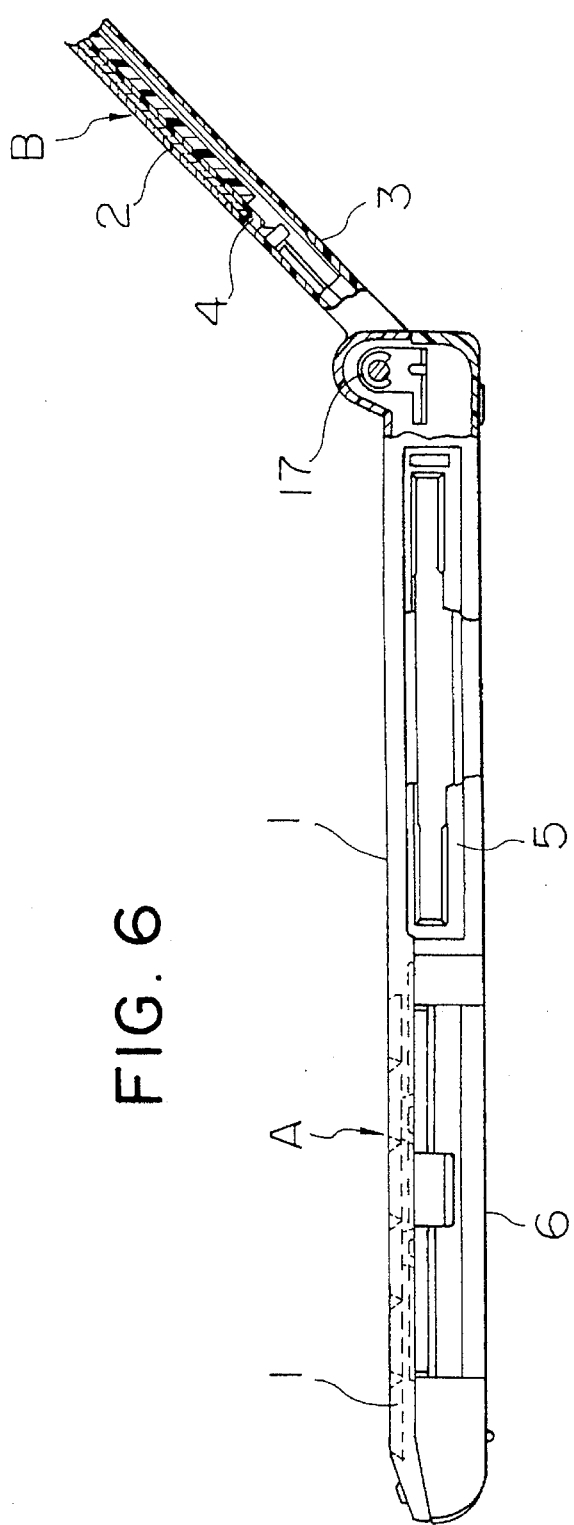
FIG. 6 is a side elevational view of the wordprocessor in the state for use, with a part of a liquid crystal display device removed.

Referring to FIG. 1, a book-type wordprocessor embodying the present invention has a main body A which has a tabular rectangular form, and a cover B which is pivotally secured to the rear edge of the main body A by means of a hinge mechanism 17. The main body A has a lower part 6 and an upper part 7 which are both formed of a plastic material. The lower and upper parts 6 and 7 are coupled to each other by means of screws (not shown) in such a manner as to define an internal space therebetween. The cover B is constructed as a display support assembly which supports a liquid crystal display device 2 to be described later in detail. The assembly has a generally flat support plate 3 and a window frame 4 fixed to the support plate 3. The liquid crystal display device 2 has a display surface which is exposed through a window, i.e., an opening 4', defined by the window frame 4. After use of the wordprocessor, the cover B is swung from the open position shown in FIGS. 1 and 6 to a close position where the liquid crystal display device 2 is held close to the upper surface of the main body A. When the cover B is in the close position, the liquid crystal display device 2 is protected by the support plate 3.

Three rectangular openings 7a, 7b and 7c are formed in the top wall 7' of the upper part 7 of the main body A. More specifically, the first and second openings 7a and 7b are disposed side by side along the front edge of the upper part 7, while the third opening 7c is disposed at a position which is close to the left edge of the upper part 7 and disposed between the opening 7a and the rear edge of the upper part 7. An information entry keyboard 1 has numerous keys which are used mainly for inputting character information and which are disposed in the first and second openings 7a and 7b. A function keyboard 8 having a plurality of function keys is disposed in the third opening 7c. For a reason which will be described later, a disk drive 5 serving as an external storage driving means for driving an external storage medium such as a floppy disk is disposed in the main body A, i.e., in the space between the lower and upper parts 6 and 7, at a position between the function keyboard 8 and the right edge of the main body A.

In general, the operability, i.e., ease of manipulation, of the keys used in information processing apparatus such as a wordprocessor depends on the operation stroke (depth to which the key can be pushed down). More specifically, for ease of manipulation, each key preferably has a certain key stroke. In the illustrated embodiment of the present invention, therefore, the design is such that the keys of the information entry keyboard 1, which are operated more frequently than the function keys, have optimum key strokes and are arranged along the front edge of the main body A, whereas the function keys of the function keyboard 8 which are used less frequently than the keys of the information entry keys have smaller key strokes, as will be described later and are arranged at positions rearwardly spaced from the front edge of the main body A. This arrangement is effective to reduce the breadthwise dimension of the main body A, i.e., the length of the front edge.

Figure 4:
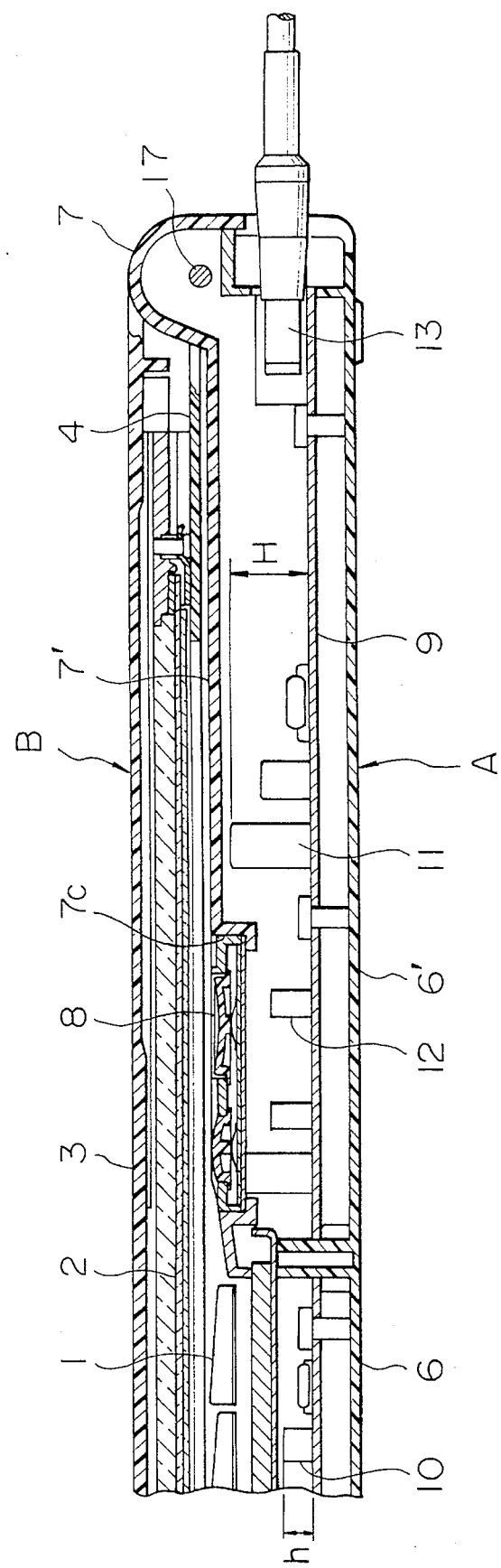
FIG. 4 is a fragmentary enlarged sectional view of the wordprocessor take substantially along the line IV—IV in FIG. 3.

Referring to FIGS. 2 to 4A, a single control circuit board 9 which is of a unitary structure and controls the whole apparatus is disposed in the main body A at a position beneath the information entry keyboard 1 and the function keyboard 8 and extends in parallel with the bottom wall 6' of the lower part 6 of the main body A, as will be best seen from FIG. 4. The control circuit board 9 carries thereon a control circuit unit 10 which is composed of parts having a comparatively small mounting height h and which is disposed beneath the information entry keyboard 1. A power supply circuit unit 11 which essentially has parts of a comparatively large mounting height H is disposed rearwardly of the function keyboard 8 and is mounted on the control circuit board 9.

The control circuit board 9 also has mounted thereon connectors 12 for the information entry keyboard 1 and the function keyboard 8. These connectors 12 are disposed under the function keyboard 8. A printer connector 13 for connection to a printer and an option connector 14 for communication function are connected to the control circuit board 9 and disposed rearwardly of the function keyboard 8. The connector 12 has a height which is intermediate between the height H of the power supply circuit unit 11 and the height h of the control circuit unit 10.

Figure 2:
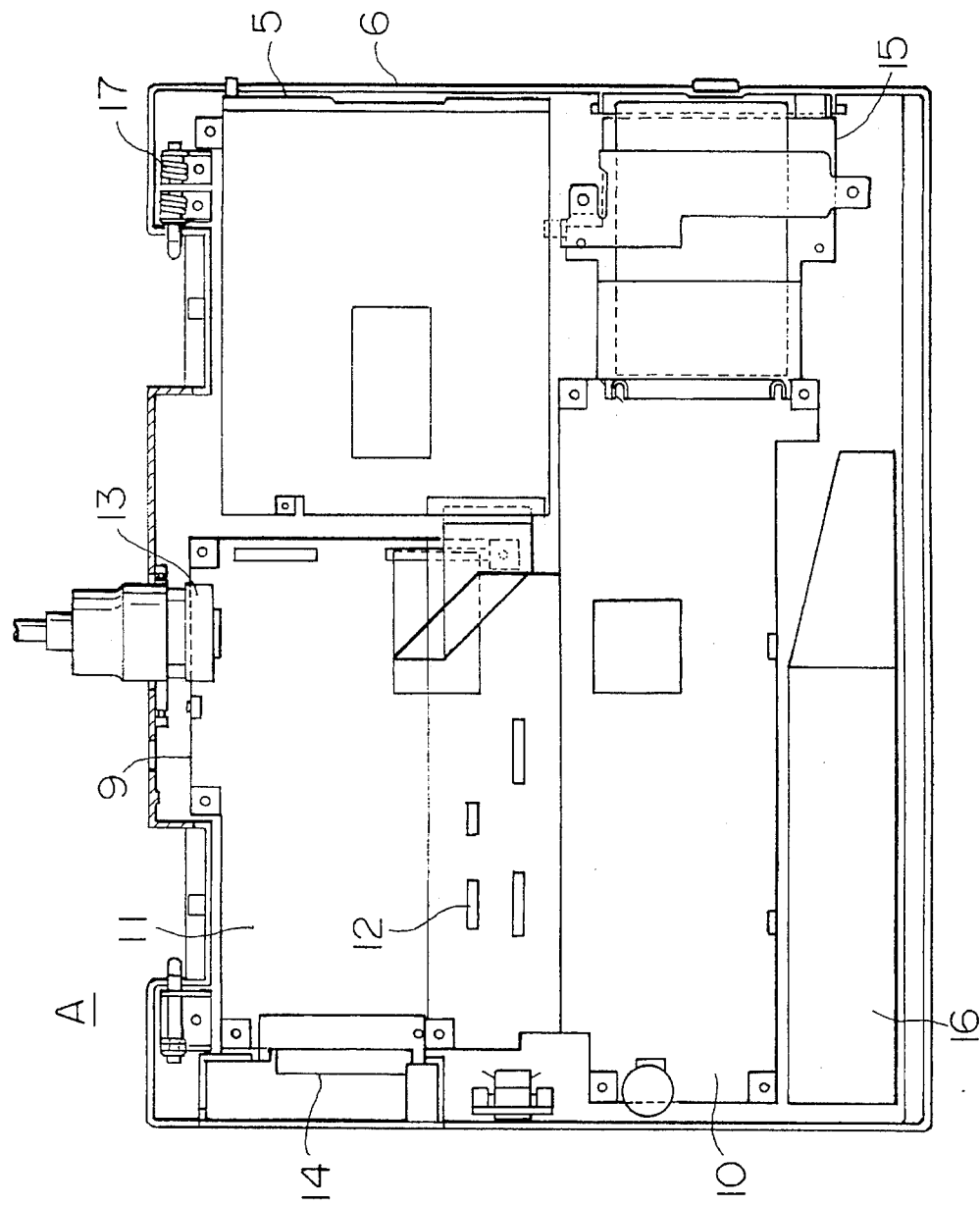
FIG. 2 is a schematic plan view of the internal structure of a main body of the wordprocessor shown in FIG. 1, illustrating the layout of various components in the main body.
Figure 3:
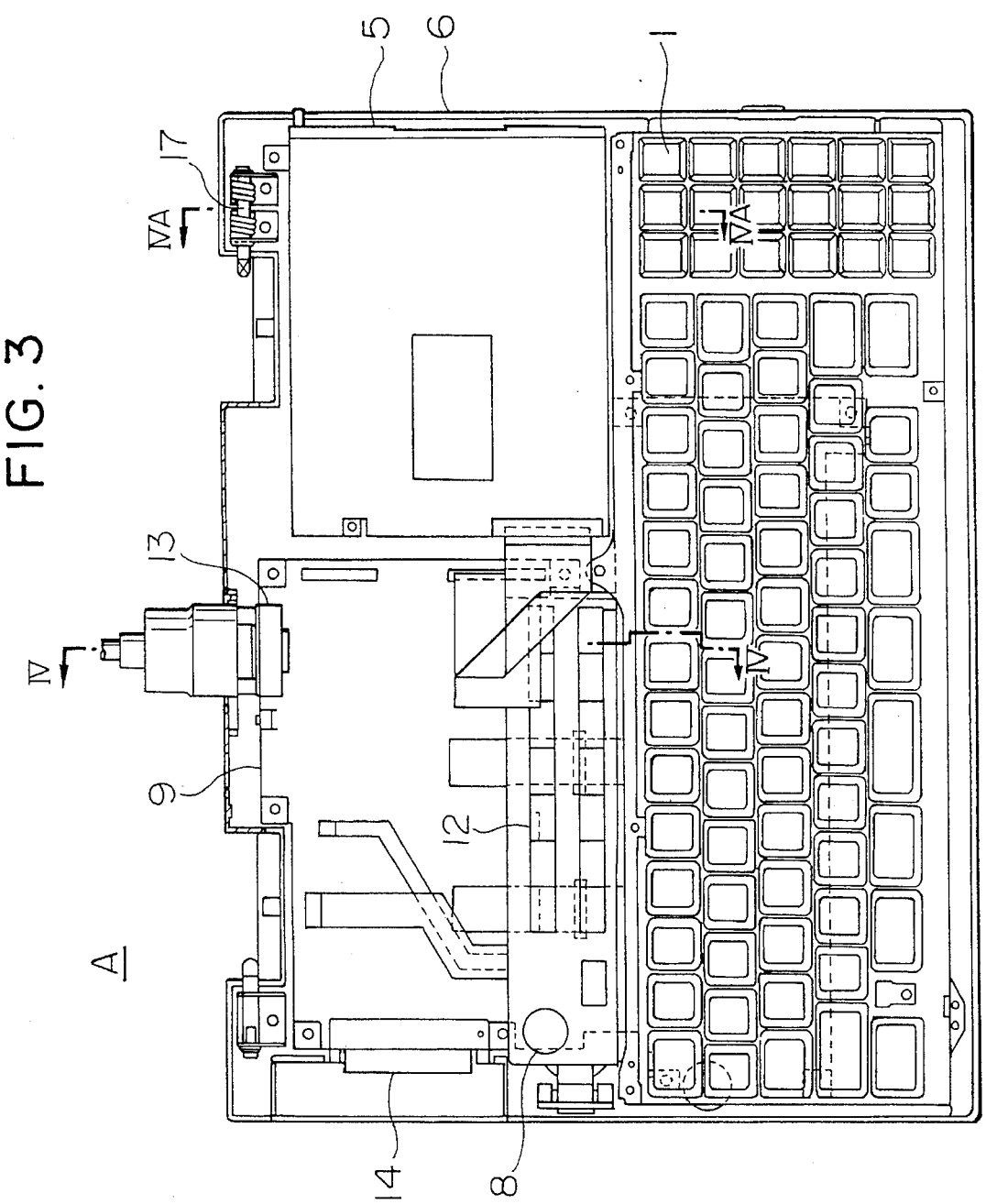
FIG. 3 is a top plan view of the main body with an upper part of the main body removed to illustrate mainly the layout of the keyboard.

Referring particularly to FIG. 2, the control circuit board 9 is provided with a card receiver 15 which is adjacent to a corner between the front edge and the right edge of the main body A and which is adapted to detachably receive an information carrier such as an IC card. A battery 16 is disposed in the main body at a position adjacent to the front edge of the main body A and is used as an internal power supply when an AC adapter is not used.

Figure 5:
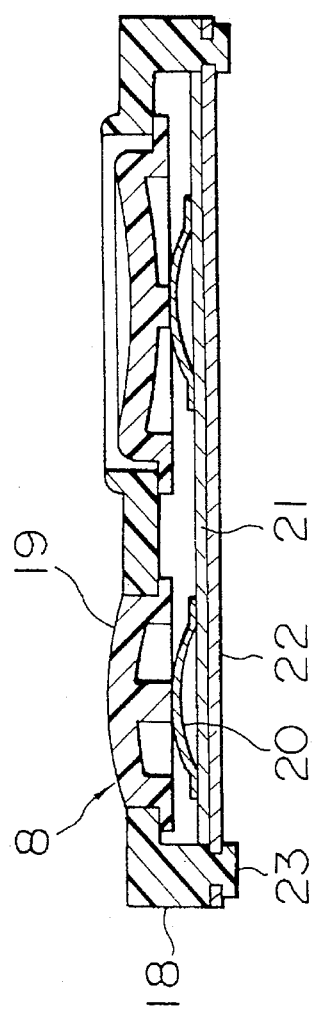
FIG. 5 is an enlarged sectional view of a function keyboard.

Referring to FIGS. 4 and 5, the function keyboard 8 is designed to have a thin-walled structure unlike the information entry keyboard 1 since the connectors 12 having greater height than the height h of the control circuit 10 is disposed under this keyboard 8. More specifically, the function keyboard 8 has a frame 18 of a plastic material which is to be secured to the upper part 7 of the main body A and a plurality of vertically movable key tops 19 disposed inside the frame. These key tops 19 are integrally molded from a plastic material and are connected together through thin webs, as well known to those skilled in the art. An inversion spring 20 of a spring material such as phosphor bronze is disposed under each key top 19. A membrane switch 21 is disposed beneath the spring 20 and is supported by a support plate 22. The support plate 22 has small apertures formed therein along the peripheral edges thereof. Projections 23 formed on the bottom surface of the frame 18 are inserted into the apertures and thermally deformed so as to fix the frame 18 to the support plate 22, thus realizing a thin-walled structure for the function keyboard 8. The key tops 19 and the inversion springs 20 are not essential. Namely, the function keyboard 8 may have such a construction that the membrane switches 21 are directly manipulated by operator's fingers.

The disk drive 5 is the component which has the greatest height (thickness) among the components encased in the main body A. The disk drive 5, therefore, is placed between the bottom wall 6' of the lower part 6 and the top wall 7' of the upper part 7 of the main body A without any intermediary between the disk drive 5 and the walls 6' and 7'. The heights of the tracks of the components are so determined that the top of the information entry keyboard 1 and the top of the function keyboard 8 are substantially flush with the level of the top wall 7' of the position of the upper part 7 where the disk drive 5 is disposed. To obtain such an arrangement, the height of the stack composed of the bottom wall 6' of the lower part 6 of the main body A, the control circuit board 9, the control circuit unit 10 and the information entry keyboard 1 is substantially the same as that of the stack composed of the bottom wall 6', the disk drive 5 and the top wall 7' of the upper part 7 of the main body A. Similarly, the height of the stack composed of the bottom wall 6' of the lower part 6, the control circuit board 9, the connectors 12 and the function keyboard 8 is substantially the same as that of the stack composed of the bottom wall 6', the disk drive 5 and the top wall 7' of the upper part 7 of the main body A. Furthermore, the height of the stack composed of the bottom wall 6' of the lower part 6, the internal battery 16 and the information entry keyboard 1 is substantially the same as that of the stack composed of the bottom wall 6', the disk drive 5 and the top wall 7' of the upper part 7 of the main body A. In addition, the height of the stack composed of the top and bottom walls 7' and 6' of the upper and lower parts 7 and 6, the control circuit board 9 and the power supply circuit unit 11 is substantially the same as the height of the stack composed of the top and bottom walls 7' and 6' of the upper and lower parts 7, 6 of the main body and the disk drive 5.

By virtue of the two- and three-dimensional arrangements of the components described above, the main body A has reduced two- and three-dimensional sizes.

A description will now be made of the cover B. i.e., the display support assembly B, with reference to FIGS. 7 to 10.

Figure 7:
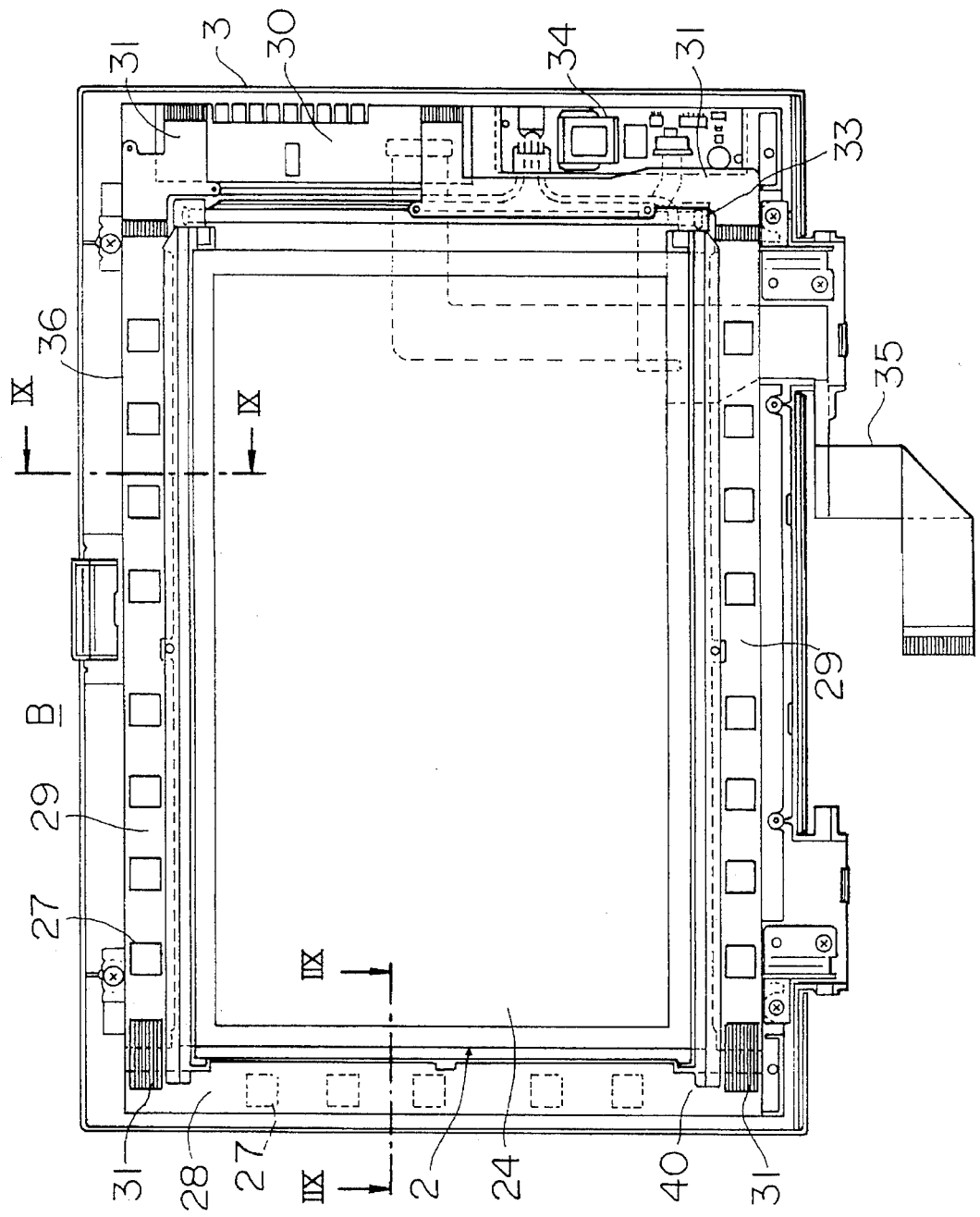
FIG. 7 is a plan view of the liquid crystal display device.
Figure 8:
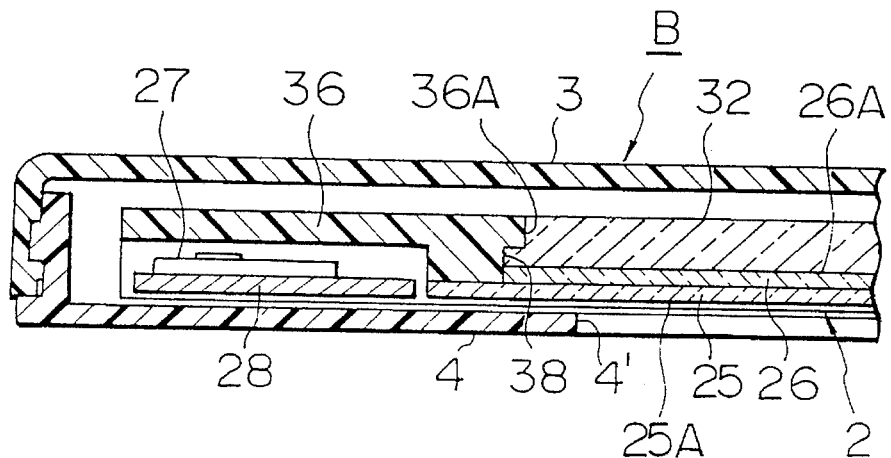
FIG. 8 is a fragmentary enlarged sectional view of the liquid crystal display device taken along a line IIX—IIX in FIG. 7.

As shown in FIG. 7, the liquid crystal display device 2 supported by the support plate 3 and the window frame 4 has a liquid crystal display portion 24 which is exposed through the opening 4' defined by the window frame 4. The liquid crystal display portion 24 has an outer LCD glass sheet 25 and an inner LCD glass sheet 26 which are superposed leaving a cavity therebetween. This cavity is filled with a liquid crystal (not shown) in a manner known per se, with the peripheral edge of the gap being sealed to confine the liquid crystal therein. An outer deflection plate 25A and an inner deflection plate 26A are bonded to the surfaces of the LCD glass sheets as known to those skilled in the art.

In order to realize a thin-walled construction of the liquid crystal display device, a common circuit board 28 and segment circuit boards 29, each carrying COBs (Chips-on-board), are disposed in the regions between the support plate 3 and the window frame 4 so as to surround the liquid crystal display portion 24. These circuit boards 28 and 29 are connected to the electrodes of the LCD glass sheets by heat-seal technique. A liquid crystal control circuit board 30 for controlling the circuit boards 28 and 29 is disposed adjacent to one side edge of the liquid crystal display portion 24 so as to extend substantially in the same plane as the LCD glasses 25 and 26. The common circuit board 28 and the segment circuit boards 29 are electrically connected to the liquid crystal control circuit board 30 through flexible harnesses 31.

Figure 9:
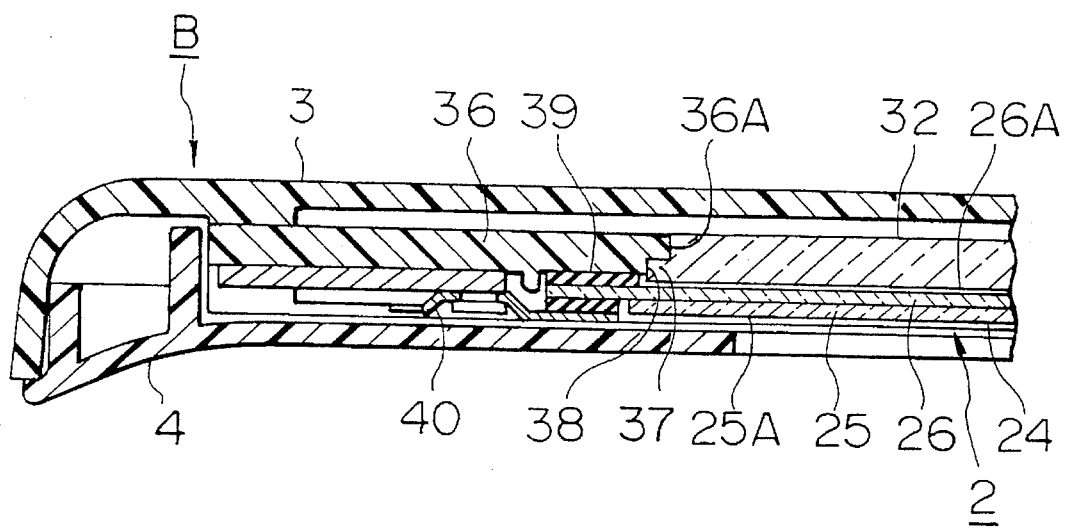
FIG. 9 is an enlarged sectional view of the liquid crystal display device taken along the line IX—IX in FIG. 7.
Figure 10:
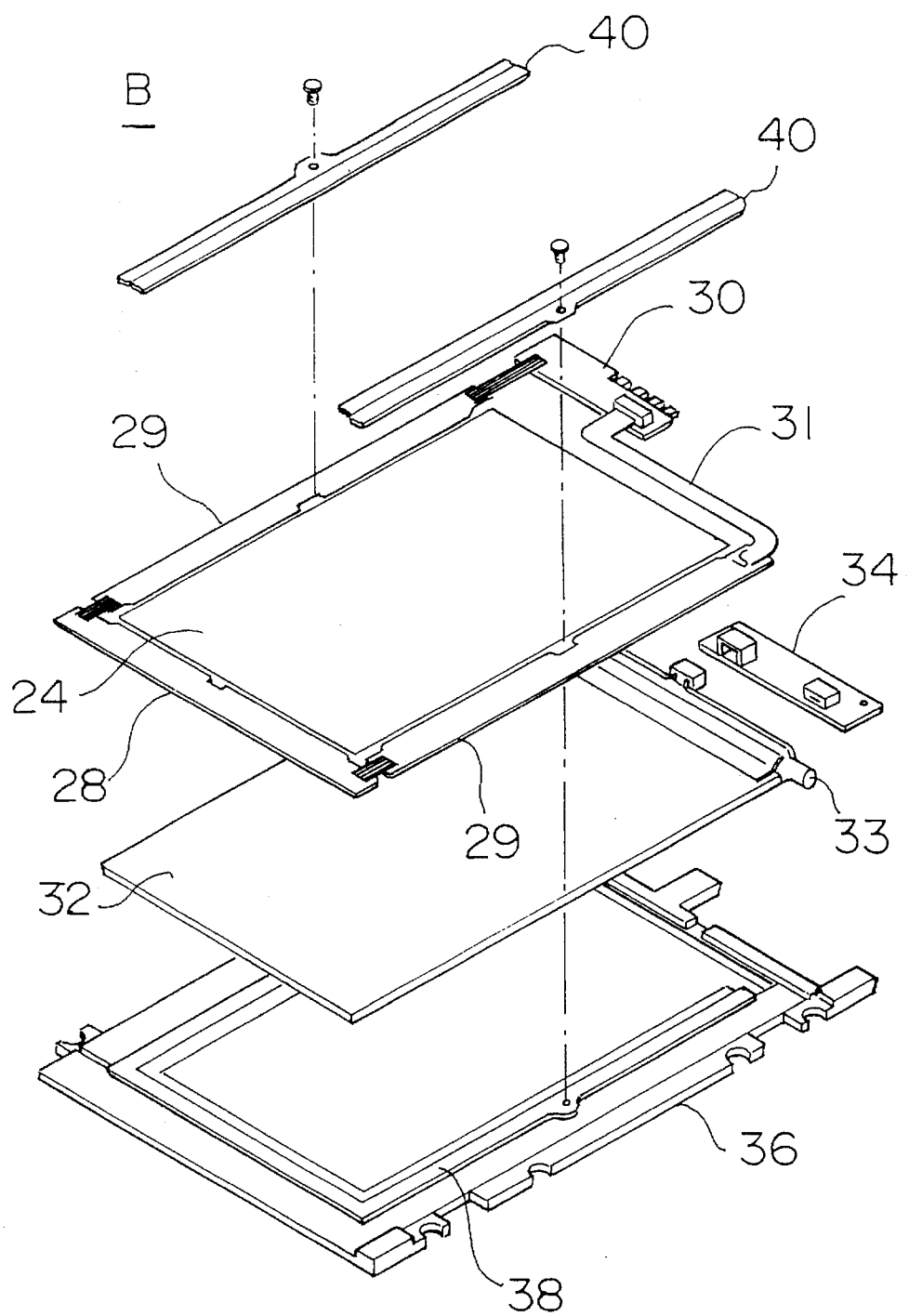
FIG. 10 is an exploded perspective view of the liquid crystal display device showing components of the device.

Referring specifically to FIG. 9, a light guide plate 32 made of, for example, an acrylic resin is disposed between the inner LCD glass sheet 26 and the support plate 3 so as to oppose the entire area of the LCD glass sheet 26. A cold cathode ray tube 33 as light source is arranged along one side edge of the light guide plate 32. Light from the cold cathode ray tube 33 is uniformly guided to the entire area of the liquid crystal display portion 24 through the light guide plate 32. An inverter circuit board 34 for energizing the cathode ray tube 33 is disposed substantially in the same plane as the liquid crystal control circuit board 30 in a side-by-side fashion therewith and is electrically connected through a flexible cable 35 to the control circuit board 9 mounted in the main body A so as to be supplied with electrical power from the circuit board 9.

An LCD frame made of a plastic material and having a rectangular opening is disposed between the support plate 3 and the window frame 4. The liquid crystal display portion 24, the common circuit board 28, the segment circuit boards 29, the liquid crystal control circuit board 30 and the inverter circuit board 34 are secured to this LCD frame 36 so as to occupy substantially the same plane. In order to realize such a structure, a recess 38 is formed in the inner peripheral edge surface 36A of the LCD frame 36 so as to open towards the liquid crystal display portion 24, while a mating projection 37 is formed on the outer peripheral edge of the light guide plate 32 adjacent the liquid crystal display portion 24. The light guide plate 32 is mounted on the LCD frame 36 with its projection 37 fitting in the recess 38 in the LCD frame 36. The inner LCD glass sheet 26 of the liquid crystal display portion 24 has an outer edge portion which projects beyond the outer peripheral edge of the outer LCD glass sheet 25. Rubber cushioning members 39 are secured to both surfaces of the outer edge portion of the LCD glass sheet 26. A pair of clamps 40 made of a metal are fixed to the LCD frame 36. The clamps 40 have inner peripheral edge portions which press the outer peripheral edge portions of the inner LCD glass sheet 26 against the LCD frame 36 to fix the inner LCD glass sheet 26 thereto.

Thus, the liquid crystal display device 2 has a thickness which is equal to the thickness of the stack of the LCD glass sheets 25 and 26 and the light guide plate 32, such stack thickness being the minimum thickness required for a liquid crystal display device of the type described. The cover B, i.e., the display support assembly, can thus have minimized thickness, with the liquid crystal display device 2 of the minimal thickness clamped between the support plate 3 and the window frame 4.

It will be understood from the foregoing description that the present invention provides a portable information processing apparatus, e.g., a wordprocessor, having a main body A and a cover or display support assembly B both having remarkably reduced thicknesses. Consequently, the thickness and weight of the whole information processing apparatus are remarkably reduced to facilitate transportation and use of the apparatus.

What is claimed is:

1. A portable information processing apparatus, comprising:

a main body supporting keyboard means, a control circuit board for controlling said apparatus and drive means for driving an external storage means; and display support means pivotally connected to said main body and supporting liquid crystal display means;

said main body including a lower part having a bottom wall and an upper part having a top wall, said drive means being interposed between said bottom wall and said top wall;

said control circuit board being disposed between said bottom wall and said keyboard means so that said control circuit board does not substantially overlap with said drive means, wherein said keyboard means includes an information entry keyboard, and wherein control circuit means is disposed between said information entry keyboard and said control circuit board, and a stack of said bottom wall, and said control circuit board, said control circuit means and said information entry keyboard has a height substantially the same as a height of a portion of said top wall covering said drive device.

2. A portable information processing apparatus comprising:

a main body supporting keyboard means, a control circuit board for controlling said apparatus and drive means for driving an external storage means; and display support means pivotally connected to said main body and supporting liquid crystal display means;

said main body including a lower part having a bottom wall and an upper part having a top wall, said drive means being interposed between said bottom wall and said top wall;

said control circuit board being disposed between said bottom wall and said keyboard means so that said control circuit board does not substantially overlap with said drive means, power supply circuit means disposed between said control circuit board and said top wall; said keyboard means including a function keyboard, and connector means disposed between said function keyboard and said control circuit board for providing electrical connection between said keyboard and said power supply circuit means, a stack of said bottom wall, said control circuit board, said connector means and said function keyboard having a height which is substantially the same as a height of a portion of said top wall coveting said drive device.

3. A portable information processing apparatus according to claim 2, wherein said function keyboard includes a membrane switch member.

4. A portable information processing apparatus, comprising:

a main body supporting keyboard means, a control circuit board for controlling said apparatus and drive means for driving an external storage means; and display support means pivotally connected to said main body and supporting liquid crystal display means;

said main body including a lower part having a bottom wall and an upper part having a top wall, said drive means being interposed between said bottom wall and said top wall;

said control circuit board being disposed between said bottom wall and said keyboard means so that said control circuit board does not substantially overlap with said drive means, wherein said keyboard means includes an information entry keyboard, said apparatus further comprising: control circuit means disposed between a part of said information entry keyboard and said control circuit board, and an internal battery disposed between another part of said information entry keyboard and said bottom wall, a stack of said bottom wall, said internal battery and said another part of said information entry keyboard having a height which is substantially the same as a height of a portion of said top wall coveting said drive device.

5. A portable information processing apparatus, comprising:

a main body supporting keyboard means, a control circuit board for controlling said apparatus and drive means for driving an external storage means; and display support means pivotally connected to said main body and supporting liquid crystal display means;

said main body including a lower part having a bottom wall and an upper part having a top wall, said drive means being interposed between said bottom wall and said top wall;

said control circuit board being disposed between said bottom wall and said keyboard means so that said control circuit board does not substantially overlap with said drive means, wherein said control circuit board has a portion interposed between said bottom wall and said top wall, said apparatus further comprising power supply circuit means disposed between said portion of said control circuit board and said top wall, a stack of said bottom wall, said top wall, said control circuit board and said power supply circuit means having a height which is substantially the same as a height of a portion of said top wall covering said drive device.

6. A portable information processing apparatus, comprising:

a main body;

an information entry keyboard mounted on said main body and having a plurality of keys for inputting mainly character information;

a function keyboard secured to said main body and having a plurality of function keys;

a control circuit board for controlling said apparatus, said control circuit board being carded by said main body at a position under said information entry keyboard and said function keyboard:

power supply circuit means provided on a circuit board;

drive means for driving external storage means for storing information input through operation of said information entry keyboard, said drive means being secured to said main body;

liquid crystal display means for displaying one of data input through operation of said information entry keyboard and information stored in said external storage means; and display support means supporting said liquid crystal display means and pivotally connected to said main body;

wherein said information entry keyboard is disposed along a front edge of said main body, said function keyboard is disposed between said information entry keyboard and a rear edge of said main body, and said drive means is disposed in lateral alignment with said function keyboard;

wherein said function keys of said function keyboard have key strokes smaller than those of said keys of said information entry keyboard, said apparatus further comprising: connector means for connecting at least one of said information entry keyboard and said function keyboard to said power supply circuit means, said connector means being disposed under said function keyboard and secured to said control circuit board.

7. A portable information processing apparatus according to claim 6, further comprising control circuit means disposed between said information entry keyboard and said control circuit board, a stack of the bottom wall of said lower part, said control circuit board, said control circuit means and said information entry keyboard having a height substantially the same as the height of the top wall of the portion of said upper part accommodating said drive means.

8. A portable information processing apparatus, comprising:

a main body;

an information entry keyboard mounted on said main body and having a plurality of keys for inputting mainly character information;

a function keyboard secured to said main body and having a plurality of function keys;

a control circuit board for controlling said apparatus, said control circuit board being carried by said main body at a position under said information entry keyboard and said function keyboard;

power supply circuit means provided on a circuit board;

drive means for driving external storage means for storing information input through operation of said information entry keyboard, said drive means being secured to said main body;

liquid crystal display means for displaying one of data input through operation of said information entry keyboard and information stored in said external storage means; and display support means supporting said liquid crystal display means and pivotally connected to said main body;

wherein said information entry keyboard is disposed along a front edge of said main body, said function keyboard is disposed between said information entry keyboard and a rear edge of said main body, and said drive means is disposed in lateral alignment with said function keyboard;

further comprising connector means for connecting at least one of said information entry keyboard and said function keyboard to said power supply circuit means, a stack of said bottom wall, said control circuit board, said connector means and said function keyboard having a height substantially the same as the height of the top wall of the portion of said upper part accommodating said drive means.

9. A back-light type portable information processing apparatus comprising:

a main body supporting a control circuit board and drive means for driving an external storage means;

keyboard means secured to said main body;

display support means pivotally connected to said main body; and liquid crystal display means supported by said display support means and including a liquid crystal display panel and liquid crystal control circuit board means supporting at least one chip;

wherein said liquid crystal control circuit board means is disposed adjacent to and outwardly of the peripheral edge of said liquid crystal display panel and such that a height of a top face of said chip does not exceed a height of a top face of said liquid crystal display panel, and wherein said liquid crystal control circuit board means includes a common circuit board and a segment circuit board.

10. A portable information processing apparatus according to claim 9, wherein said liquid crystal display means further includes a light guide plate disposed behind said liquid crystal display portion, a light source disposed adjacent to a peripheral edge of said liquid crystal display portion for applying light to said light guide plate, and an inverter circuit board for controlling said light source, said light source and said inverter circuit board being disposed substantially in the same plane as said liquid crystal display portion and thus said liquid crystal control circuit board means.

11. A portable information processing apparatus according to claim 10, wherein each of said light source and said inverter circuit board has a thickness which does not exceed the thickness of a stack of said liquid crystal display portion and said light guide plate.

12. A portable information processing apparatus according to claim 10, wherein said liquid crystal display portion includes at least one LCD glass sheet which is disposed adjacent to and in parallel with said light guide plate, said light guide plate and said LCD glass sheet being clamped at their peripheral edges by an LCD frame, said liquid crystal control circuit board means being disposed on said LCD frame.

13. A portable information processing apparatus according to claim 12, wherein said display support means includes a support plate and a window frame fixed to said support plate, said LCD frame being disposed between said support plate and said window frame and elastically secured to said support plate.

14. A portable information processing apparatus comprising:

a main body;

an information entry keyboard mounted on said main body and having a plurality of keys for inputting mainly character information;

a function keyboard secured to said main body and having a plurality of function keys;

a control circuit board for controlling the whole apparatus, said control circuit board being carried by said main body at a position under said information entry keyboard and said function keyboard;

power supply circuit means provided on a circuit board;

drive means for driving external storage means for storing information input through operation of said information entry keyboard, said drive means being mounted on said main body;

liquid crystal display means for displaying one of data input through operation of said information entry keyboard and information stored in said external storage means; and display support means supporting said liquid crystal display means and pivotally connected to said main body;

said information entry keyboard being disposed along a front edge of said main body, said function keyboard being disposed between said information entry keyboard and a rear edge of said main body, and said drive means being disposed in lateral alignment with said function keyboard;

said liquid crystal display means including a liquid crystal display portion and a liquid crystal control circuit board means, said liquid crystal control circuit board means being disposed adjacent to a periphery of said liquid crystal display portion and having a thickness which does not exceed a thickness of said liquid crystal display portion.

15. A portable information processing apparatus comprising:

a main body supporting keyboard means, a control circuit board for controlling said apparatus and drive means for driving an external storage means; and display support means pivotally connected to said main body and supporting liquid crystal display means;

said main body including a lower part having a bottom wall and an upper part having a top wall, said drive means being interposed between said bottom wall and said top wall, a portion of said top wall covering said drive means having a first height;

said control circuit board being disposed between said bottom wall and said keyboard means, a stack of said bottom wall, said control circuit board and said keyboard means having a height substantially the same as said first height;

said liquid crystal display means including a liquid crystal display portion and liquid crystal control circuit board means; and said liquid crystal control circuit board means being disposed adjacent a peripheral edge of said liquid crystal display portion and having a thickness which does not exceed the thickness of said liquid crystal display portion.

16. A portable information processing apparatus according to claim 15, wherein said drive means is mounted on said bottom wall of said main body lower part and said control circuit board is so shaped and sized as to allow said drive means to be disposed between said bottom and top walls of said main body and mounted on said bottom wall.

17. A portable information processing apparatus according to claim 16, wherein said liquid crystal control circuit board means is disposed in substantially the same plane as said liquid crystal display portion, said liquid crystal control circuit board means includes a liquid crystal control circuit board, a common circuit board and segment circuit boards, and said liquid crystal control circuit board, said common circuit board and said segment circuit boards are arranged around said liquid crystal display portion and are electrically connected to one another through flexible cables.

18. A portable information processing apparatus comprising:

a main body supporting keyboard means, a control circuit board for controlling the whole apparatus and drive means for driving an external storage means;

display support means pivotally connected to said main body; and liquid crystal display means supported by said display support means;

said main body including a lower part having a bottom wall and an upper part having a top wall, said drive means being interposed between said bottom wall and said top wall;

said control circuit board being disposed between said bottom wall and said keyboard means;

said liquid crystal display means including a liquid crystal display portion, a light guide plate disposed behind and adjacent to a rear side of said liquid crystal display portion, a cold cathode ray tube for applying light to said light guide plate, an inverter circuit for controlling said cold cathode ray tube, and liquid crystal control circuit board means;

said cold cathode ray tube, said inverter circuit board and said liquid crystal control circuit board means being disposed adjacent to a periphery of said liquid crystal display portion and substantially in the same plane as said liquid crystal display portion; and each of said cold cathode ray tube, said inverter circuit board and said liquid crystal control circuit board means having a thickness which does not exceed a thickness of a stack of said liquid crystal display portion and said light guide plate.

19. A portable information processing apparatus according to claim 18, wherein said drive means is mounted on at least one of said bottom wall and said main body lower part and said control circuit board is so shaped and sized as to allow said drive means to be disposed between said bottom and top walls of said main body and mounted on said bottom wall.

20. A portable information processing apparatus comprising:

a main body supporting keyboard means, a control circuit board for controlling the whole apparatus and drive means for driving an external storage means; and display support means pivotally connected to said main body and supporting liquid crystal display means;

said main body including a lower part having a bottom wall and an upper part having a top wall, said drive means being interposed between said bottom wall and said top wall;

said control circuit board being disposed between said bottom wall and said keyboard means;

said liquid crystal display means including a liquid crystal display portion and liquid crystal control circuit board means; and said liquid crystal control circuit board means being disposed adjacent a peripheral edge of said liquid crystal display portion and having a thickness which does not exceed the thickness of said liquid crystal display portion.

21. A portable information processing apparatus comprising:

a main body supporting keyboard means, a control circuit board and drive means for driving an external storage means; and a display support pivotally mounted on said main body and supporting liquid crystal display means including a liquid crystal display portion having a display surface and liquid crystal control circuit board means;

said main body including a lower part having a bottom wall and an upper part having a top wall, said drive means being interposed between said bottom wall and said top wall;

said display support being pivotally movable between a first position in which said display surface is positioned close to and directed toward said keyboard means and said top wall, and a second position in which said display surface is positioned angularly remote from said keyboard means and said top wall;

said control circuit board carrying thereon a control circuit unit of a first height and a power supply unit of a second height greater than said first height;

said circuit board being disposed in said main body and extending in substantially parallel relationship to said bottom wall of said main body lower part so that said circuit board does not substantially overlap with said drive means;

said control circuit unit and said power supply unit being disposed in different areas of said control circuit board.

22. A portable information processing apparatus according to claim 21, wherein said keyboard means includes an information entry keyboard disposed along a front edge of said main body and having a plurality of information entry keys and a function keyboard separated from said information keyboard and having a plurality of function keys, each of said information entry keys having a key stroke greater than a key stroke of each of said function keys, wherein said control circuit board further has mounted thereon a connector for said information entry keyboard and said function keyboard, said connector having a third height between said first and second heights, wherein said information entry keys and said function keys having key tops disposed substantially in the same plane as said top wall of said main body, and wherein said control circuit unit is disposed between said information entry keyboard and said control circuit board, said connector is disposed between said function keyboard and said control circuit board, and said power supply unit is disposed between said top wall and said control circuit board.

23. A portable information processing apparatus according to claim 22, wherein said function keyboard is disposed rearwardly of said information entry keyboard and said drive means is disposed substantially in lateral alignment with said function keyboard.

24. A back-light type portable information processing apparatus comprising:

a main body supporting a control circuit board and drive means for driving an external storage means;

keyboard means secured to said main body;

display support means pivotally connected to said main body; and liquid crystal display means supported by said display support means and including a liquid crystal display panel and liquid crystal control circuit board means;

wherein said liquid crystal control circuit board means includes electrical elements for controlling said liquid crystal display panel and a circuit board supporting said electrical elements, and wherein said electrical elements and said circuit board are disposed adjacent to, and outwardly of, the peripheral edge of said liquid crystal display panel and do not exceed the top face of said liquid crystal display panel.

25. A portable information processing apparatus comprising:

a keyboard member supporting keys for inputting information;

a casing member supporting said keyboard member and accommodating a control circuit board for controlling the apparatus and a driving mechanism for driving an external storage memory, said casing member having a bottom wall, said keyboard member having a top wall;

a flat type display device having a liquid crystal display panel and pivotally connected to said keyboard member;

a light guide plate disposed on a back face of said liquid crystal display panel to guide light toward a front face of said liquid crystal display panel; and a light source disposed adjacent to said light guide plate; and a display panel control circuit board means disposed adjacent to, and outwardly of, the peripheral edge of said liquid crystal display panel, wherein said display panel control circuit board means is provided with integrated circuit elements having top faces not higher in height than said front face of said liquid crystal display panel.

26. The portable information processing apparatus according to claim 25, wherein said display panel control circuit board means comprises a common circuit board for common electrodes of said liquid crystal display panel and a segment circuit board for driving electrodes of said liquid crystal display panel.

27. The portable information processing apparatus according to claim 25, wherein said display panel control circuit board means comprises a liquid crystal control circuit board, a common circuit board for common electrodes and a segment circuit board for driving electrodes of said liquid crystal display panel.

28. A portable information processing apparatus comprising:

a main body supporting keyboard means, a control circuit board for controlling said apparatus and drive means for driving an external storage means; and display support means pivotally connected to said main body and supporting liquid crystal display means;

said main body including a lower part having a bottom wall and an upper part having top wall, said drive means being interposed between said bottom wall and said top wall;

said control circuit board being disposed between said bottom wall and said keyboard means so that said control circuit board does not substantially overlap with said drive means, a portion of said top wall which does not overlap with said drive means having a first height, a stack of said bottom wall, said control circuit board and said keyboard means having a height substantially the same as said first height.

29. A back-light type portable information processing apparatus comprising:

a main body supporting a control circuit board and drive means for driving an external storage means;

keyboard means secured to said main body;

display support means pivotally connected to said main body; and liquid crystal display means supported by said display support means and including a liquid crystal display portion and liquid crystal control circuit board means supporting at least one chip;

wherein said liquid crystal control circuit board means is disposed adjacent to, and outwardly of, the peripheral edge of said liquid crystal display portion such that a top face of said chip does not exceed the top face of said liquid crystal display portion, and wherein said liquid crystal control circuit board means includes a liquid crystal control circuit board, a common circuit board and a segment circuit board, and said liquid crystal control circuit board, said common circuit board and said segment circuit board are arranged around said liquid crystal display portion within a space defined between outer extensions of two major surfaces of said liquid crystal display portion and are electrically connected to one another through flexible cables.

30. A back-light type portable information processing apparatus comprising:

a main body supporting a control circuit board and drive means for driving an external storage means;

keyboard means secured to said main body;

display support means pivotally connected to said main body; and liquid crystal display means supported by said display support means and including a liquid crystal display portion and liquid crystal control circuit board means;

wherein said liquid crystal control circuit board means includes electrical elements for controlling said liquid crystal display portion and a structural member supporting said electrical elements, wherein said electrical elements and said structural member are disposed adjacent to, and outwardly of, the peripheral edge of said liquid crystal display portion and have a total thickness which does not exceed the thickness of said liquid crystal display portion, and wherein said total thickness of said electrical elements and said structural member does not extend beyond outer extensions of two major surfaces of said liquid crystal display portion.

* * * * *